US006183163B1

(12) United States Patent
Nikiforov et al.

(10) Patent No.: US 6,183,163 B1
(45) Date of Patent: Feb. 6, 2001

(54) METHOD AND APPARATUS FOR LAYING OUT A PIPELINE

(76) Inventors: Vladimir Nikolaevich Nikiforov, 625026 Republika str. 155/b, ap. 25; Rafael Alexandrovich Kolesnikov; Sergei Rafaelyevich Kolesnikov, both of 625023, Przhevalski str. 35, ap. 53, all of Tyumen (RU)

(*) Notice: Under 35 U.S.C. 154(b), the term of this patent shall be extended for 0 days.

(21) Appl. No.: 09/168,246

(22) Filed: Oct. 8, 1998

(51) Int. Cl.[7] .............................. B23B 47/22; E02F 5/10; E03F 3/06; E21B 7/26; E21B 7/30; E21B 11/02; F16L 1/028

(52) U.S. Cl. .................... 405/184; 405/174; 405/181; 405/303; 173/141; 175/19; 175/62; 175/293

(58) Field of Search ........................... 405/154, 174, 405/180, 181, 183, 184, 303; 173/141; 175/19, 21, 62, 293

(56) References Cited

U.S. PATENT DOCUMENTS

| 3,789,614 | * | 2/1974 | Rogers | 405/182 |
|---|---|---|---|---|
| 3,859,809 | * | 1/1975 | Clayhold et al. | 405/179 |
| 4,014,175 | * | 3/1977 | Brink | 405/183 |
| 4,362,435 | * | 12/1982 | Henry | 405/154 |
| 4,726,711 | * | 2/1988 | Tian | 405/184 |
| 5,368,413 | * | 11/1994 | Moore | 405/154 |

FOREIGN PATENT DOCUMENTS

| 2070302 C1 | 12/1996 | (RU) . |
|---|---|---|
| 1310481 A1 | 5/1987 | (SU) . |
| 1361411 A1 | 12/1987 | (SU) . |
| 1452899 A1 | 1/1989 | (SU) . |
| 1548361 A1 | 3/1990 | (SU) . |

* cited by examiner

Primary Examiner—Eileen D. Lillis
Assistant Examiner—Tara L. Mayo
(74) Attorney, Agent, or Firm—Anderson, Kill & Olick P.C.

(57) ABSTRACT

A method and apparatus for laying a pipeline. Working and receiving pits are dug out. An active working member is dropped into the working pit at a preselected depth. The active working member is fixed to a vertical knife of a power mechanism. Polyethylene pipeline is secured to an end part of the active working member. Then the power mechanism is energized and simultaneously horizontal pulling forces of the power mechanism are applied to the vertical knife. The active working member may be a drill head with different nozzles (bits) connected with a mud supply unit by a hose passing through a hollow portion of the vertical knife. On a non-working end of the active member the pipeline is fixed by an adapter.

12 Claims, 2 Drawing Sheets

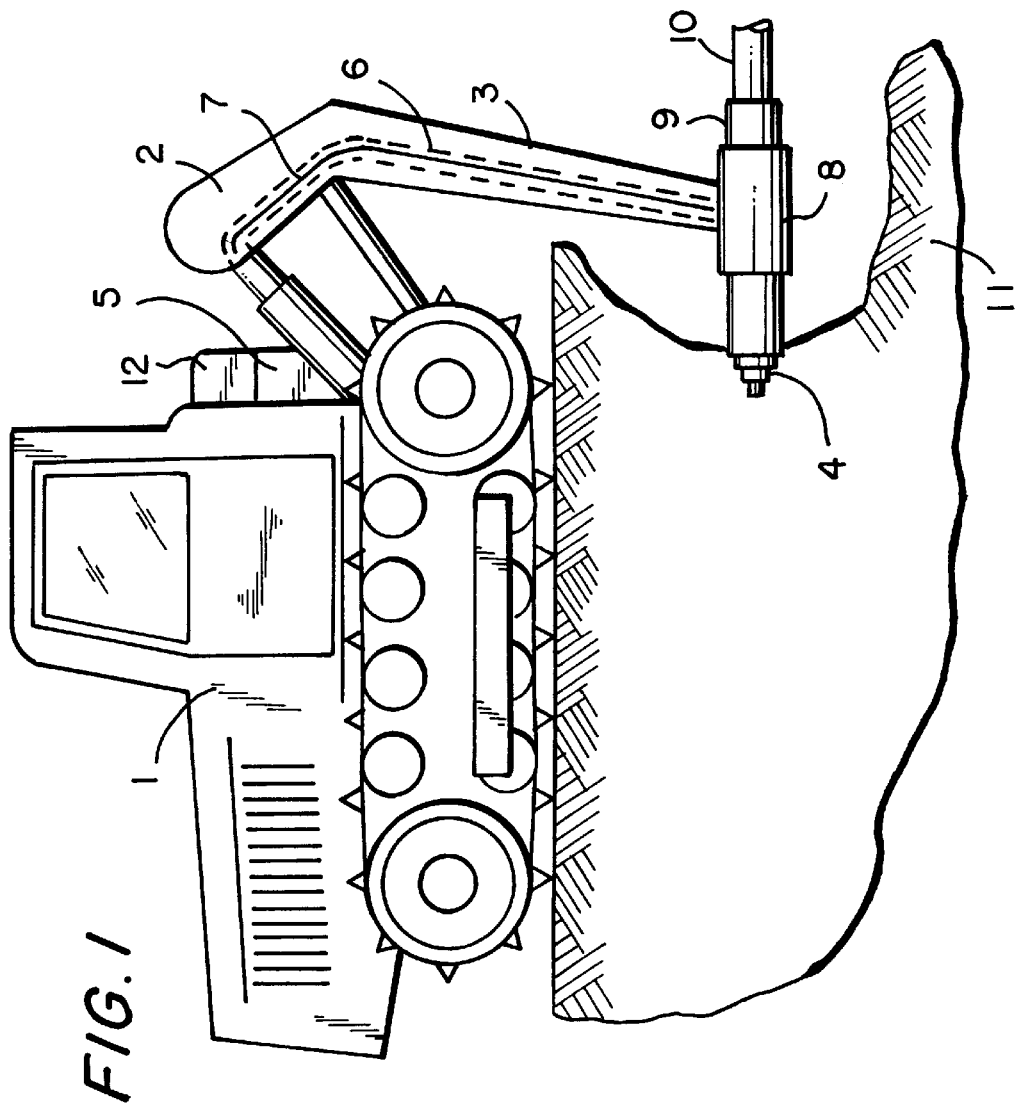

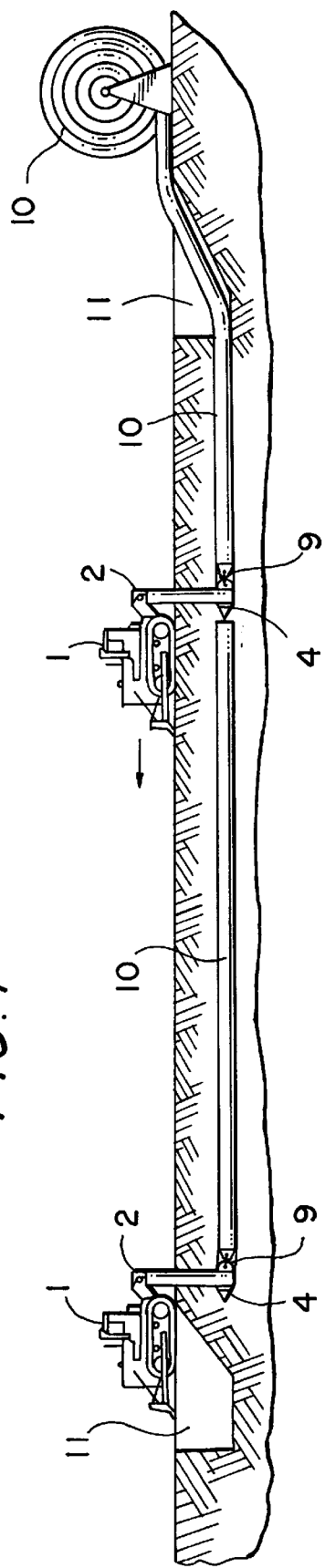
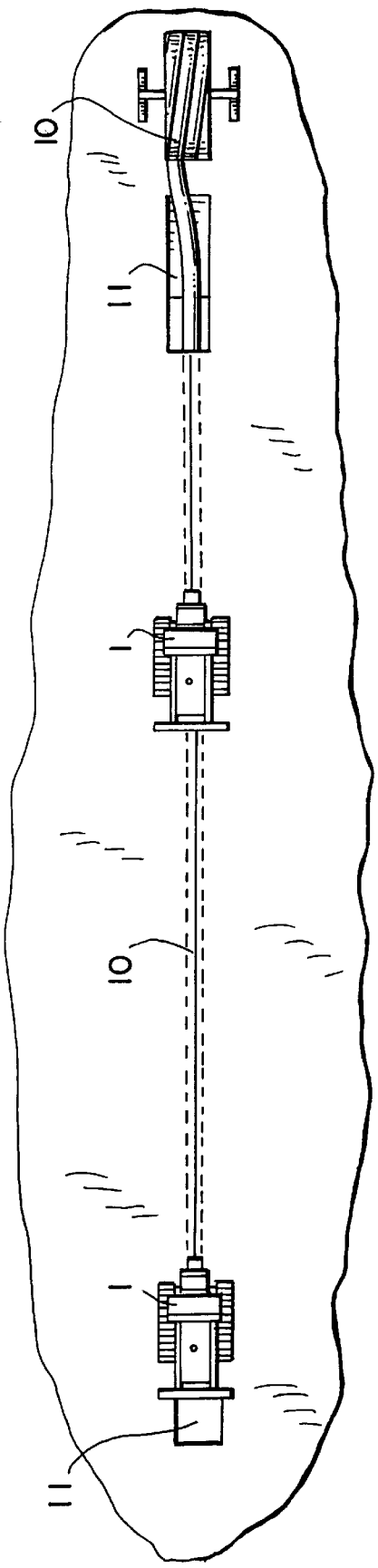

METHOD AND APPARATUS FOR LAYING OUT A PIPELINE

TECHNICAL FIELD

This invention relates to pipeline transport and may be used for laying smaller pipelines, as well as cable lines in areas where the underground lines are missing or exist in limited quantities.

BACKGROUND OF THE INVENTION

The method of laying pipeline in the soil is known, where the well is made by the boom with simultaneous laying out of the protective inflated sheath and supply of the binder to the exterior wall of this sheath. The braid is put between the exterior surface of the inside protective sheath and the well wall. The binder is supplied to the braid cavity, and the protective inflated sheath is supplied to the braid cavity through the binder layer, in this case the additional exterior inflated sheath is put to the well before the sheath and the interior protective inflated sheath. (See Author' Certificate of the USSR No 1310481, MPK E02F 5/10, F16L 1/01, published on May 15, 1987).

The disadvantages of the known method are its high cost and low efficiency. Besides this method is not ecologically pure.

These advantages are due to the limited pipeline length, expensive technological equipment, frequent breaks of the inflated sheath, as well as by low pipelaying rate and formation of dead zones in the well bottom because of the preparation and leaking of the binder. The method of pipelaying in the soil, taken as a prototype, is known, which consists in excavation of the working and reception pits, forcing the pipes through by applying to their tail end the effort of a power mechanism with successive extending and joining of pipes. Soil is forced into the pipes and subsequently removed. In this case the excavation pipes are used as front pipes, having a total length not less than the distance between pits, and the soil is removed from excavator pipes as a measure of their reaching the reception pit. The separation flange is installed between the front and tail sections, besides the effort of passing through is created by the drawing power mechanism, or by the joint action of the beating mechanism and the drawing or forcing through power mechanism. The joining excavator pipes are carried by an interior cone on their tail part, which at the forcing through is formed by the beating mechanism. The effort of the passing through is created by drawing a rope connected to the front of the tail pipe which is pulled through, and putting the drawing rope on the line of the underground passage, and passing the pulling rope through a hole in the separation flange. (See Patent No 2070302 of the Russian Federation, MPK F16L 1/028, published on Dec. 10, 1996). The defect of the known method taken as prototype is its low efficiency and high cost of the pipelaying.

This defect is due to high pulling requirements, applied by a pulling power mechanism, limited pipeline length, which entails frequent installations of separation flanges, and, consequently, preparation of new working and reception pits. Besides, it violates the soil ecology because of frequent application to excavator pipes and large number of pits.

A device for trenchless pipelaying in the soil is known, which includes a sheath made as central front and expanded tail parts connected between them, a pneumatic beater, put inside the front part of the sheath and fixed to it by fixers, flexible links fixed in the sheath and a pressing flange to press the laid pipes. The tail part of the sheath is made as mutually crossing tube elements, which axes are parallel to the sheath axis, and connections of the face and front parts are made as ellipsoidal surfaces of crossing of tube elements inclined by its planes towards these elements; the fixers are made as two shoulder levers and are fixed by hinges, besides, the device has removable covers to ensure access to the fixers and fixtures of the flexible links, located in connection places of the front and face parts of the sheath (See Author's Certificate of the USSR No 1548361, MPK E02F 5/18, F16L 1/00, published on Mar. 7, 1990).

The defect of the known device is low output and missing long-time orientation. The abovementioned defects are due to limited pipeline length, design particularities of the device, namely application of only pneumatic loads.

A device for trenchless pipelaying is known as well, which contains the pipe-sheath, cylindric pump, located in it, which has the function to take the soil and the tail part, stop wall, expulsor of the soil, located in the part to tail soil, fixing mechanism and the pump moving mechanism, power block. The pump part to take soil and the tail part are formed by rigid partition installed in the pump body. With this the power block is located telescopically in the tail part and located in the body, rigidly connected to the stop partition, power cylinders block, which bodies are connected by hinges to the stop partition, and the rods with the partition. With this the fixing mechanism is located on the stop wall, power block has additional power cylinders, which rods by its holes, made in the rigid partition, are connected with the soil expulsor, and the pump is made with wheels, preceded by folding back disposal knifes (See Author's Certificate No 1452899 of the USSR, MPK EO2F 5/18, F16L1/00, published on Jan. 23, 1989).

The defect of the known device is its low output.

This defect is due to limited pipeline length, construction particularities of the device, not allowing to increase the passing rate.

The closet background art is the machine for laying out of the trunklines, taken as a prototype, having the basic machine with knife boom, a device to support soil and two supports for pipes. This basic machine has two mated tractors, connected between them by the coupling frame, connected to tractor undercarriages by ball joints. It has a pulling boom, connected to the coupling frame and the tractor brackets by hinges. The knife boom is fixed at the pulling boom, one of the supports for the pipe is located at the upper part of the knife boom, and the other at the front part of the basic machine, besides, the supports for the pipe are made adjustable by height, and the two disposals excavating boom is fixed at the pulling boom (See Author's Certificate No 1361411 of the USSR, MPK F16L 1/100, published on Dec. 23, 1987).

The defect of the known aggregate is low output and the high cost of pipelaying. This defect is due to limited pipe of the line and construction particularities of the aggregate.

SUMMARY OF THE INVENTION

The aim of this invention is to increase the output of pipelaying and the simultaneous reduction of the prime cost and protection of the environment.

To resolve this task, when as in the known method of the pipelaying, the working and reception pits are excavated. In accordance with the principles of the present invention the active member is placed into the working pit at a preselected depth and is fixed to the vertical knife of the power mechanism. Then the pipe to be laid is attached to the tail part of the mentioned active working member, and is put in movement. At the same time the directed horizontal pulling efforts of the vertical knife surface part power mechanism are applied to the reception pit. For this the polyethylene pipeline and the known pipelaying system are used, which include the power mechanism with vertical knife. According to the present invention, at the lower end of the knife the active member is fixed, and to its non-working end the pipe to be laid is fixed with use of an adaptor. The vertical knife is made hollow, the system is additionally equipped with a drilling mud unit, and the active member is made as drilling head, connected to the mentioned drilling mud unit by a hose, passing through the vertical knife cavity. An advantage of the system is also that the active members can be made as a pneumatic beating head, connected by a hose, passing through the cavity of the vertical knife, to a compressed air source, by screw head, cone head or screw, which are connected to the power unit located at the power mechanism.

There is the following link of causes and consequences between the distinctive features and achieved technical result of the present invention.

The proposed pipelaying technology allows to increase output and to decrease at the same time the prime cost due to simplicity and mobility of the method, which ensures the pipelaying at minimum of the used technical means, practically having the only power mechanism (T-130 tractor). The use of the active working member which may be drilling head with different attachments (bits) or pneumatic beater, screw of the conical compactor or screw head, in connection with vertical knife, fixed at the power mechanism, will allow, practically without any additional costs, considerably reduction in the pulling efforts of the latter and to increase its speed, which gives possibility to increase the output five times and to reduce the pipelaying prime cost at the same time. The fixing of the pipe to the non-working and of the active member will allow, in contrast to analogs and prototypes, to carry out pipelaying at the same time with drilling of horizontal well by previously corrected path from the working pit to the reception pit without inconveniencies and delays, due to limited pipeline length, because the polyethylene pipe, coming from the coil, may at any moment be extended, by replacing the old coil by a new one without stopping the power mechanism or preparation of an additional pit, which also reduces the prime cost and increase the works output. The use of the minimum technical means quantity (only one T-130 tractor) is testimony that the proposed method is not only inexpensive, but also ecologically pure.

The use of a hollow vertical knife will allow the connecting of the active working member with the power unit of the tractor and penetration of a horizontal well in the ground of different hardness in form of the pneumatic impact head, spiral head, conical seal, auger or drill head with different bits, where the supply of drilling mud which cools the bit and thickens walls of a formed well is executed by a hose passing through the cavity of a vertical knife.

The combination of essential features which characterize the spirit of the present invention may be multiply used in laying of pipes and cable lines with receiving technical result which is in ecology preservation when the productivity of produced works increases and simultaneously the cost price decreases, that allows to make conclusion about correspondence of the invention to the criteria "industrial applicability".

BRIEF DESCRIPTION OF DRAWINGS

FIG. 1 is a side view of the mechanism for laying pipe;

FIG. 2 is a side view of an auger used in conjunction with this device;

FIG. 3 is a side view of a conical thickener used in conjunction with this device;

FIG. 4 is a side view of a spiral head used in conjunction with this device;

FIG. 5 is a side view of a pneumatic hammer used in conjunction with this device;

FIG. 6 is a side view of a hydraulic hammer used in conjunction with this device;

FIG. 7 is an illustration of the method of the present invention for laying a pipeline in a receiving pit using a power mechanism with a vertival knife; and FIG. 8 is a top plan view thereof.

DETAILED DESCRIPTION OF THE PREFERRED EMBODIMENT OF THE INVENTION

Referring to FIGS. 1–8, the system of laying the pipeline consists of a power mechanism 1, with a vertical knife 2, on the lower part 3 of which the working member is fixed. The member 4 is in the form of a pneumatic impact head connected with a power unit 5, (source of compressed air) located on the power mechanism 1 with a hose 6, passing through a cavity of the vertical knife 2. On the non-working end 8 of the active working member 4 the laying pipeline 10 is fixed with an adapter 9. The pipeline 10 is made of polyethylene. The installation of the system begins after excavating the working pit 11.

The method is executed as follows:

Initially two pits are dug, one is the working pit 11 and second is a receiving (pit not shown in the FIGURE). Into the working pit 11 the active working member 4 in the form of a pneumatic impact head is dropped to a depth of 170 meters. The pneumatic impact items (working member) 4 is fixed to the low end 3 of the vertical knife 2 of the power mechanism 1 (tractor T-130).

Thereafter the polyethylene pipeline 10 to be laid is fixed to the non-working end 8 of the active working organ 4 using adapter 9 the pneumatic impact head is energized at the same time that horizontal directional pulling forces of the power mechanism 1 are applied to the vertical knife 2 in the receiving pit. Fixed on the non-working end 8 of the active working number 4 the laying pipeline 10 made of polyethylene automatically unwinds from its coil. When operating with a substantial length of pipeline, the end of the laid pipeline is attached to the beginning of the pipeline of the next coil of polyethylene and moreover the process of laying is not stopped.

Industrial Applicability

The application of the above described method of laying of the pipeline and the system for its implementation has allowed the productivity of the operation to be increased by increasing the penetration speed and substantially to decrease the cost of penetration and to preserve the environment.

What is claimed is:

1. The method of laying a pipeline in the ground using a power mechanism having a vertical knife and an active working member, said method comprising the steps of excavating working and receiving pits spaced from each other and laying the pipeline between them by dropping the active working member a preselected depth into the working pit, said active working member being mounted on the vertical knife of the power mechanism, attaching the pipeline to an end of said working member, energizing said power mechanism and simultaneously applying horizontally directed pulling forces of the power mechanism to the vertical knife in the direction of the receiving pit, wherein said pulling forces are substantially transmitted to said pipeline to advance the pipeline with the working member.

2. The method according to claim 1, wherein the pipeline is made of polyethylene.

3. The system for laying a pipeline comprising a power mechanism; a vertical knife attached to said power mechanism and having a lower end; an active working member mounted on said lower end of said vertical knife, said active working member having a working end and a non-working end; and an adapter fixed on the non-working end of said member adapted to be fixed to the pipeline to be laid.

4. The system as claimed in claim 3, wherein said vertical knife has a hollow portion and means in said hollow portion for energizing said power mechanism.

5. The system as claimed in claim 4, wherein said energizing means is a unit for the supply of mud, said working end of said active working member is a drill head connected with said unit for mud supply by a hose passing through said hollow portion of said vertical knife.

6. The system as claimed in claim 4, wherein said working end of said active working member is a pneumatic impact head connected with said energizing means in the form of a power mechanism by a hose passing through said hollow portion of said vertical knife.

7. The system as claimed in claim 3, wherein said working end of said active working member is a spiral head.

8. The system as claimed in claim 7, wherein a power unit is connected to said power mechanism and said spiral head is connected to said power unit.

9. The system as claimed in claim 3, wherein said working end of said active working member is a conical thickener.

10. The system as claimed in claim 9, wherein a power unit is connected to said power mechanism and said conical thickener is connected to said power unit.

11. The system as claimed in claim 3, wherein said working end of said active working member is an auger.

12. The system as claimed in claim 11, wherein a power unit is connected to said power mechanism and said auger is connected to said power unit.

\* \* \* \* \*